R. M. MILLER.
MILKING MACHINE.
APPLICATION FILED SEPT. 8, 1914.
1,189,468.
Patented July 4, 1916.
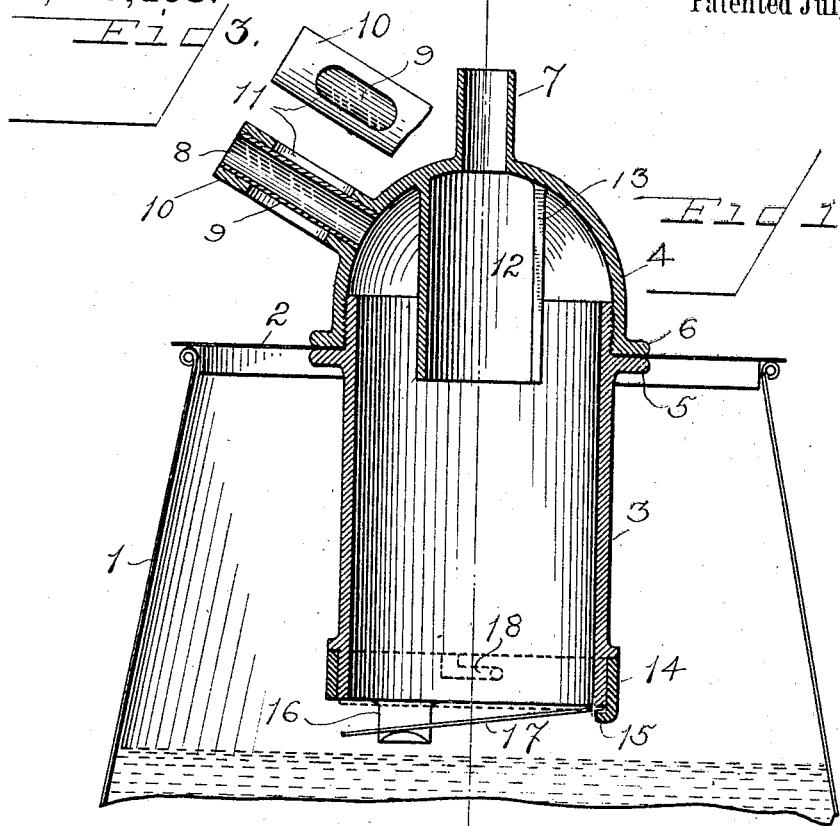
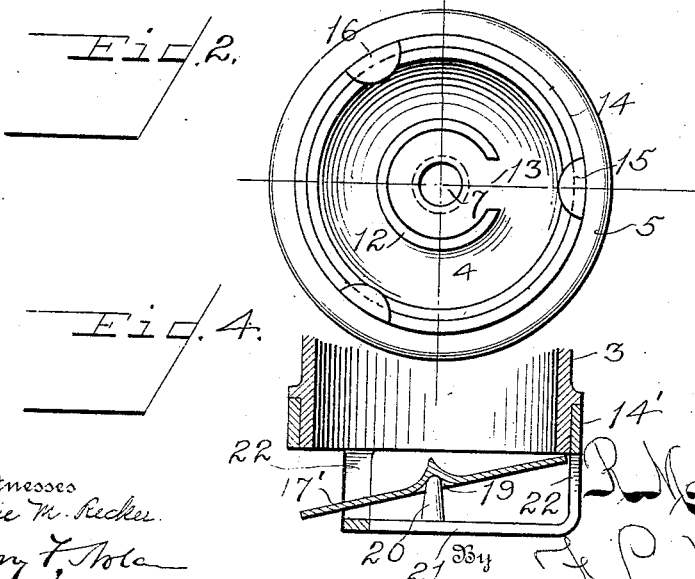
Witnesses
Carrie M. Recker
Harry F. Stola
Inventor
R. Mander Miller
By J. L. Walker
Attorney

UNITED STATES PATENT OFFICE.

REUBEN MANLEY MILLER, OF DAYTON, OHIO, ASSIGNOR, BY MESNE ASSIGNMENTS, TO N. D. RUTHERFORD.

MILKING-MACHINE.

1,189,468.  Specification of Letters Patent.  Patented July 4, 1916.

Application filed September 8, 1914. Serial No. 860,527.

*To all whom it may concern:*

Be it known that I, REUBEN MANLEY MILLER, citizen of the United States, residing at Dayton, in the county of Montgomery and State of Ohio, have invented certain new and useful Improvements in Milking-Machines, of which the following is a specification.

My invention relates to mechanical milking apparatus and particularly to a vacuum or suction chamber therefor.

The object of the invention is to simplify the structure as well as the means and mode of operation of such devices whereby they will not only be cheapened in construction but will be more efficient in use, positive in operation, quick in action, easily operated, and unlikely to get out of repair.

Mechanical milking apparatus, as usually constructed, embodies a suction pump, a tubular connection designed for attachment to the animal, and a chamber common to both the pump and tubular connection in which the induced flow of milk is received. It has been found undesirable in practice to make the pail or ultimate receiver the vacuum chamber due to the difficulties experienced in rendering the pail or receiver air tight and the deleterious effect of the exhaustion of the entrained air from the milk. Such constructions have also been found inefficient and defective through the constantly decreasing volume or capacity of the vacuum chamber as the pail or receiver is filled.

One of the primary objects of the present invention is to provide a vacuum chamber which will be independent of the pail or receiver and which will not necessitate the hermetically sealing of the pail or receiver during the milking operation.

A further object of the invention is to provide for such vacuum chamber an automatic valve which will relieve the vacuum within the chamber at each stroke of the pump, causing the milk to be intermittently discharged from the vacuum chamber to the pail or receiver without unduly submitting the milk to the influence of the vacuum by which the animal heat and the entrained air might be extracted.

A further object of the invention is to render said automatic valve free moving or floating, and so mounted as to be substantially self-cleansing and adapted to avoid the deposit of foreign matter or other material thereon which might tend to clog its action.

A further object of the invention is to provide means for preventing the entrainment of the milk by the air exhausted from the chamber which might tend to carry particles of milk from the chamber to the pump.

Further objects of the invention are providing means by which the flow of milk may be observed, and for detachably engaging the vacuum chamber with the cover of the pail or receiver, and for detachably connecting the floating valve with the chamber.

Referring to the drawings, Figure 1 is a vertical sectional view of the vacuum chamber applied to a receiver or retainer. Fig. 2 is a detail bottom plan view of the vacuum chamber with the floating valve removed. Fig. 3 is a detail view of the observation port. Fig. 4 is a detail sectional view of a modification of the floating valve support.

Like parts are indicated by similar characters of reference throughout the several views.

The device forming the subject matter hereof may be employed with any type of a single acting or intermittent suction pump and likewise with any suitable design or type of udder attachment. The pump and udder attachment, which form no part of the present invention, have not been illustrated in the drawings, and will not be described. Such devices are now common in the art.

In the drawing, 1 is the pail or container in which the milk is received. The pail or container is provided with a removable cover 2 on which is supported the vacuum chamber forming the subject matter hereof. The vacuum chamber is preferably though not necessarily formed in two parts separable one from the other and comprising a barrel portion 3 and a top or dome portion 4 detachably connected with the barrel portion 3 by screw threading or other means. The barrel 3 and dome 4 are provided with peripheral flanges 5 and 6, respectively, between which the lid 2 is clamped.

Extending from the top of the dome 4 is the air outlet conduit 7 which communicates with the suction pump. Entering the dome 4 at one side thereof is the milk inlet conduit 8 which communicates with the udder connection. This inlet conduit 8 preferably comprises a glass tube 9 inclosed in a metallic sleeve 10 which is provided with a transverse opening or port 11 through which the milk passing through the glass conduit or tube 9 may be observed.

Projecting downward within the dome 4 and concentric with the outlet conduit 7 is a sleeve 12 having in one side thereof a longitudinal slot 13. The sleeve 12 acts as a baffle plate to interrupt the flow of milk and prevent it being drawn out through the outlet conduit 7. It is to be noted that the sleeve 12 is of greater diameter than the outlet conduit 7. The enlarged terminal opening of the sleeve together with the longitudinal slot 13 tends to reduce the violence with which the air is drawn from the chamber through the outlet 7 and prevents the entrainment of the milk by the air. This construction obviates the possibility of drops of milk which may trickle down the outside wall of the sleeve being drawn within the sleeve and carried off through the outlet 7 by the current of air and also reduces the exhaustion of milk spray to minimum.

At its lower end the barrel portion 3 is provided with a detachable collar 14 having a plurality of inward projecting ledges or fingers 15 and 16. The fingers or ledges 15 and 16 are preferably located at different levels or heights as shown in Fig. 1. Resting normally in inclined position upon the fingers or ledges 15 and 16 is a floating valve member 17 comprising a disk of alloy, aluminum composition or other light material adapted to seat itself upon the lower edge of the valve 3 to hermetically close the chamber. The valve member 17 is entirely free upon its supports 15 and 16 and is lifted to its seated position upon the extremity of the barrel 3 by the suction pump. Thus the initial action of the pump causes the floating valve 17 to be lifted thereby closing or hermetically sealing the vacuum chamber causing the influence of the pump to be subsequently exerted upon the udder attachment, through the conduit 8.

The flow of milk discharged through the conduit 8 to the chamber is received on the floating valve 17 which, at the end of the pump stroke, will fall through gravity due to its own weight and the weight of the milk supported, thereby allowing the milk to escape from the vacuum chamber into the pail or container. The valve 17 being free for rotary movement as well as movement to and from its seat, is adapted to clear itself of any foreign material which may lodge thereon and which might prevent a proper seating of the valve. The collar 14 may be secured by screw threading or by any other suitable means. In the drawings, it has been shown attached by the ordinary form of bayonet slot 18.

In Fig. 4 there is shown a modification of the valve support in which the floating valve member 17' is provided with a central depression 19 in which engages a supporting stud 20 projecting upward from a pendent bridge 21 carried by the detachable ring 14'. The valve member 17' in this construction is balanced upon the stud about which it is free to rotate or to oscillate. The lateral displacement of the floating valve is prevented by the arms or connections 22 of the pendent bridge. It is to be noted that the valve member is free about its entire periphery and may tilt in any direction to discharge the contents of the vacuum chamber. The operation of this device is exactly the same as that before described.

While this device is especially designed for use with milking apparatus, it is to be understood that it is not limited to such use but may form a part of a suction or pumping apparatus for various other uses. In view of its adaptability to other uses, the claims are not to be understood as limited to milking apparatus.

From the above description it will be apparent that there is thus provided a device of the character described, possessing the particular features of advantage before enumerated as desirable but which obviously is susceptible of modification in its form, proportion, detail construction or arrangement of parts without departing from the principle involved or sacrificing any of its advantages.

While in order to comply with the statute the invention has been described in language more or less specific as to certain structural features, it is to be understood that the invention is not limited to any specific details, but that the means and construction herein described comprise but one mode of putting the invention into effect, and the invention is therefore claimed broadly in any of its possible forms or modifications within the scope of the appended claims.

Having thus described my invention, I claim:

1. In an apparatus of the character described, a vacuum chamber having an orifice therein, and an independent closure member loosely supported in a normally inclined position for movement to open and close said orifice, said closure member being operative for opening movement by gravity so as to be drawn into position to close the orifice by the initial exhaustion of the chamber.

2. In an apparatus of the character described, a vacuum chamber having a normally open orifice therein, and a normally inclined closure member loosely supported and mounted for pivotal movement toward and from said orifice, said closing member being adapted for gravital opening movement and for closing movement under the initial exhaustion of said chamber.

3. In an apparatus of the character described, a vacuum chamber having an orifice therein, and a closure member therefor comprising a normally inclined plate loosely supported for pivotal movement toward and from said opening, said plate being adapted for movement by gravity to an open position and to be closed by the initial exhaustion of the chamber.

4. In an apparatus of the character described, a vacuum chamber having an orifice therein, a normally inclined independent floating closure member therefor, and means for movably supporting said member adjacent to the orifice.

5. In an apparatus of the character described, a vacuum chamber having an orifice therein, a normally inclined independent floating closure plate therefor, and means for loosely supporting said plate for pivotal movement toward and from said orifice.

6. In an apparatus of the character described, a vacuum chamber having an orifice therein, a closure member therefor and means for supporting the closure member in an inclined position adjacent to the orifice but removed therefrom.

7. In an apparatus of the character described, a vacuum chamber, a movable bottom for said chamber adapted by its movement to open and close the chamber to the atmosphere, and means supporting said movable bottom for loose universal pivotal motion, said means adapting said movable bottom to be moved in one direction by gravity and in the other direction by air pressure upon the exhaustion of the chamber.

8. In an apparatus of the character described, a vacuum chamber having an orifice therein, a loose closure plate therefor, and means for supporting said plate for universal pivotal motion adjacent to the orifice.

9. In an apparatus of the character described, a vacuum chamber having an orifice therein, and a loose closure plate therefor pivotally supported for both vibratory and revoluble movement adjacent to the orifice.

10. In an apparatus of the character described, a vacuum chamber having an orifice therein, a tilting closure plate therefor and a detachable support in which the closure plate is loosely mounted in a normally inclined position.

11. In an apparatus of the character described, a vacuum chamber having an orifice in the bottom thereof, and a loosely mounted normally inclined tilting closure plate movable vertically with relation to said orifice.

12. In an apparatus of the character described, a vacuum chamber having a lateral fluid inlet in its top, an axial-air outlet at its top, and an open end sleeve extending within the chamber in line with the air outlet and terminating above the bottom of the chamber and at a point beyond the lateral fluid inlet, said sleeve being provided with a lateral inlet port in its wall opposite the lateral fluid inlet port.

13. In an apparatus of the character described, a vacuum chamber having inlet and outlet orifices, and an open end sleeve projecting within the chamber in line with the outlet orifice and communicating with the interior thereof, said sleeve having an air inlet port in its lateral wall, substantially as specified.

In testimony whereof I have hereunto set my hand this 5th day of September A. D. 1914.

REUBEN MANLEY MILLER.

Witnesses:
 JOSEPH D. CHAMBERLAIN,
 M. C. FITZGERALD.